(12) United States Patent
Yokota et al.

(10) Patent No.: US 8,159,750 B2
(45) Date of Patent: Apr. 17, 2012

(54) ILLUMINATION STRUCTURE AND ILLUMINATION LENS MOUNTED THEREON

(75) Inventors: Shinji Yokota, Saitama (JP); Kouji Umeda, Saitama (JP)

(73) Assignee: NEC Corporation, Tokyo (JP)

( * ) Notice: Subject to any disclaimer, the term of this patent is extended or adjusted under 35 U.S.C. 154(b) by 264 days.

(21) Appl. No.: 12/078,245

(22) Filed: Mar. 28, 2008

(65) Prior Publication Data

US 2008/0192355 A1 Aug. 14, 2008

Related U.S. Application Data

(62) Division of application No. 11/235,108, filed on Sep. 27, 2005.

(30) Foreign Application Priority Data

Oct. 13, 2004 (JP) ................................. 2004-298516

(51) Int. Cl.
G02B 27/10 (2006.01)
G02B 27/14 (2006.01)
(52) U.S. Cl. ......... 359/626; 359/625; 359/634; 359/618
(58) Field of Classification Search .......... 359/694–700, 359/811–824, 625, 626, 634, 640; 362/311.06, 362/337, 97.1, 97.2
See application file for complete search history.

(56) References Cited

U.S. PATENT DOCUMENTS

| | | | |
|---|---|---|---|
| 3,822,930 A | 7/1974 | Douklias | |
| 4,942,744 A | 7/1990 | Wei | |
| 5,323,300 A | 6/1994 | McCrary | |
| 5,839,823 A | 11/1998 | Hou et al. | |
| 5,844,727 A * | 12/1998 | Partlo | 359/710 |
| 5,865,529 A | 2/1999 | Yan | |
| 6,296,370 B1 | 10/2001 | Bamber et al. | |
| 6,575,582 B2 * | 6/2003 | Tenmyo | 362/16 |
| 6,637,921 B2 | 10/2003 | Coushaine | |
| 6,770,212 B2 | 8/2004 | Hayashizaki | 216/28 |
| 6,827,467 B2 * | 12/2004 | Tenmyo | 362/268 |
| 6,882,374 B2 * | 4/2005 | Numakoshi | 348/769 |
| 6,961,190 B1 | 11/2005 | Tamaoki et al. | |
| 7,049,530 B2 | 5/2006 | Hayashizaki | 200/5 |
| 7,185,985 B2 * | 3/2007 | Hanano | 353/30 |
| 7,266,397 B2 | 9/2007 | Sato et al. | 455/575.1 |
| 7,283,313 B2 * | 10/2007 | Tamaoki et al. | 359/726 |
| 7,339,742 B2 * | 3/2008 | Amitai et al. | 359/630 |

(Continued)

FOREIGN PATENT DOCUMENTS

CN 87200775 U 6/1988

(Continued)

OTHER PUBLICATIONS

Shinji Yokota et al., USPTO Office Action, U.S. Appl. No. 11/235,108, Oct. 2, 2009, 9 pages.

*Primary Examiner* — Mohammed Hasan

(74) *Attorney, Agent, or Firm* — Foley & Lardner LLP

(57) ABSTRACT

Provided is an illumination structure which includes a light source and an illumination lens. The light source emits light in at least one wavelength band. The illumination lens includes a light receiving portion and a light outgoing portion. The light receiving portion divides the light from the light source in a plurality of different directions and the light outgoing portion emits the divided light.

25 Claims, 14 Drawing Sheets

U.S. PATENT DOCUMENTS

| | | | |
|---|---|---|---|
| RE40,239 E * | 4/2008 | Smith | 355/71 |
| 7,350,924 B2 * | 4/2008 | Hanano | 353/30 |
| 7,350,925 B2 * | 4/2008 | Engstrom | 353/38 |
| 7,529,030 B2 * | 5/2009 | Nishioka | 359/642 |
| 2003/0083107 A1 | 5/2003 | Morishima | |
| 2009/0032595 A1 * | 2/2009 | Oliva et al. | 235/454 |
| 2009/0103076 A1 * | 4/2009 | Gloeckner | 356/137 |

FOREIGN PATENT DOCUMENTS

| | | |
|---|---|---|
| CN | 1376314 A | 10/2002 |
| EP | 0 169 251 A1 | 1/1986 |
| EP | 0 708 351 | 4/1996 |
| GB | 2391746 A | 2/2004 |
| JP | 49-029784 | 3/1974 |
| JP | 49-29784 U | 3/1974 |
| JP | 2-83985 A | 3/1990 |
| JP | 2-89740 U | 7/1990 |
| JP | 03-003654 | 1/1991 |
| JP | 3-138825 A | 6/1991 |
| JP | 04-101592 | 4/1992 |
| JP | 4-329229 A | 11/1992 |
| JP | 6-242729 A | 9/1994 |
| JP | 08-023738 | 1/1996 |
| JP | 8-30211 A | 2/1996 |
| JP | 08-173598 | 7/1996 |
| JP | 10-21777 A | 1/1998 |
| JP | 10-275505 | 10/1998 |
| JP | 11-329144 A | 11/1999 |
| JP | 2000-57874 A | 2/2000 |
| JP | 2000-058925 A | 2/2000 |
| JP | U3074287 | 10/2000 |
| JP | 2001-339484 A | 12/2001 |
| JP | 2002-150867 A | 5/2002 |
| JP | 2002-370561 A | 12/2002 |
| JP | 2003-126521 A | 5/2003 |
| JP | 2003-297107 A | 10/2003 |
| JP | 2004-80390 A | 3/2004 |
| WO | WO 01/79895 A | 10/2001 |

* cited by examiner

ILLUMINATION STRUCTURE AND ILLUMINATION LENS MOUNTED THEREON

CROSS-REFERENCE TO RELATED PATENT APPLICATIONS

This application is a divisional of application Ser. No. 11/235,108, filed Sep. 27, 2005, now pending, and based on Japanese Patent Application No. 2004-298516, filed Oct. 13, 2004, by Shinji Yokota and Kouji Umeda, the disclosures of which are incorporated herein by reference in their entirety. This application claims only subject matter disclosed in the parent application and therefore presents no new matter.

BACKGROUND OF THE INVENTION

1. Field of the Invention

The present invention relates to an illumination structure that causes an emblem or the like to emit light and display with various colors, to an electronic device having the same structure installed thereon, and to an illumination lens suitable for being mounted thereon.

2. Description of the Related Art

In connection with a cellular phone, much importance has recently been placed on fashionability in addition to the original functions as a telephone. Accordingly, excellent design has been required for the cellular phone more than ever.

Moreover, since a reduction in size and weight has been required for a cellular phone, it is difficult to add extensive decorations to the cellular phone.

Conventionally, a mobile electronic device such as a cellular phone turns on and off an LED on receipt of an incoming call and notifies a cellular phone owner of the incoming call. In order to notify the incoming call, a cellular phone, which has a mechanism that causes an emblem to emit light and display with various colors, is put on the market.

For example, a cellular phone disclosed in Japanese registered utility model No. 3074287 (U3074287; document 1) includes a push button made of a diamond-cut glass bead. The technique described in document 1 is one for preventing a user' finger from slipping when a user operates the push button with mainly his/her finger head. In view of an illumination effect, this technique, however, does not provide the illumination effect that is sufficient to satisfy many users. Accordingly, there has been difficulty in providing the illumination effect such that many users can be satisfied with only by simply turning on and off the light emission.

SUMMARY OF THE INVENTION

A first exemplary feature of the present invention is to provide an illumination structure that improves an illumination effect.

According to a first exemplary aspect of the invention, there is provided an illumination structure including a light source that emits light in at least one wavelength band; and an illumination lens having a light receiving portion and a light outgoing portion wherein an incident light from the light source is divided in a plurality of different directions by the light receiving portion and the divided light is emitted from the light outgoing portion.

According to the first exemplary aspect of the present invention, the incident light from the light-emitting device is divided by the light receiving portion of the illumination lens and incident upon the illumination lens. The divided incident lights propagate through the illumination lens in different directions, and are emitted from the light outgoing portion of the illumination lens. Accordingly, the light emitted to the exterior from the light outgoing portion of the illumination lens becomes lights in which various colors are mixed. As a result, the first exemplary aspect of the preset invention brings about an excellent illumination effect as if the jewel shone, for example.

The other features and aspects of the present invention will become obvious from the detailed description of the preferred embodiments.

DETAILED DESCRIPTION OF THE PREFERRED EMBODIMENTS

A preferred embodiment of the present invention will be explained with reference to the drawings. The following will explain the preferred embodiments using mainly a case in which the present invention is applied to a foldable cellular phone. As is obvious later, the present invention can be easily applied to electronic devices other than the cellular phone.

Figure 1:
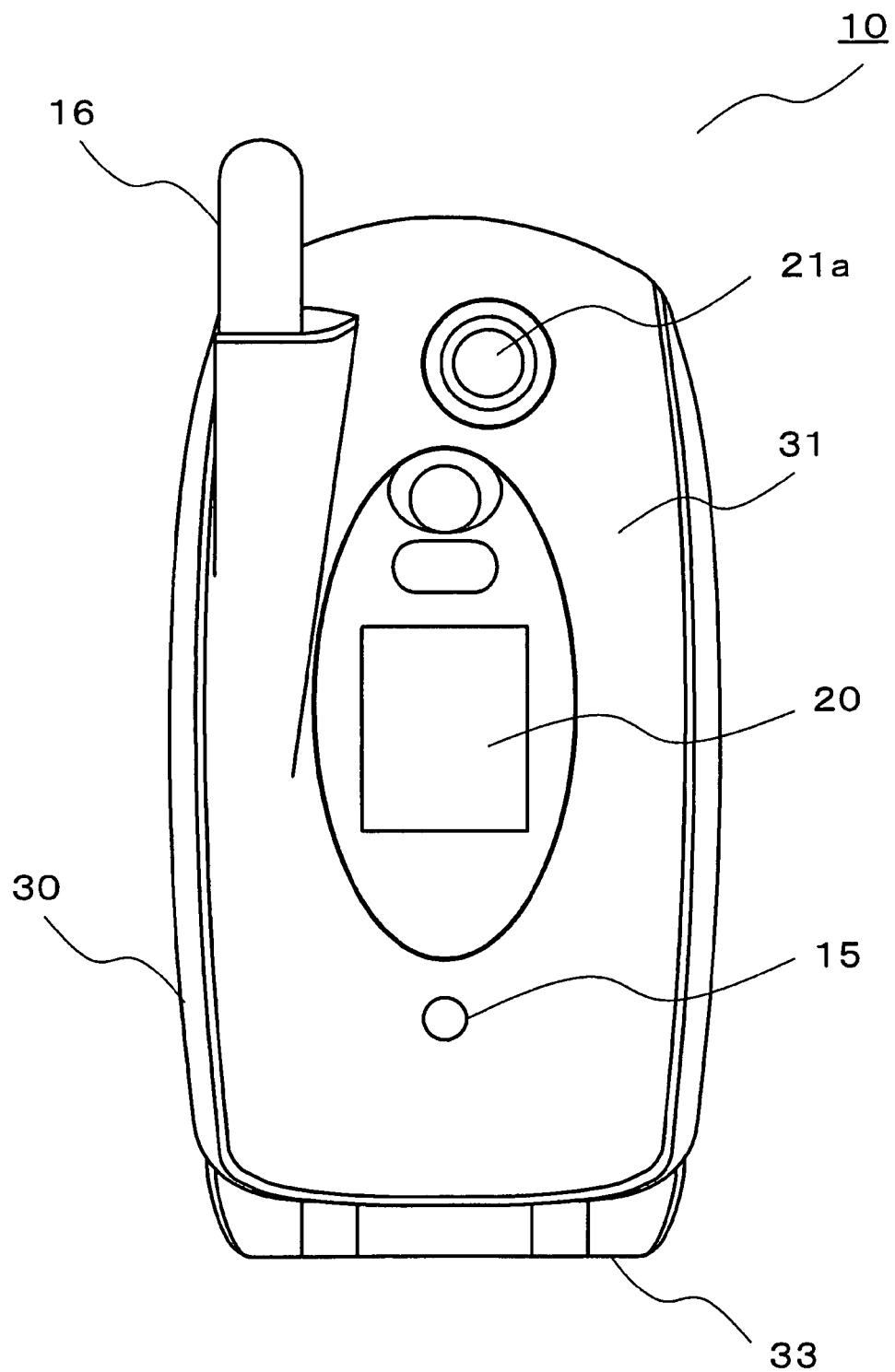
FIG. 1 is a view of an upper-side housing of a cellular phone viewed from a back side according to one embodiment of a present invention.
Figure 2:
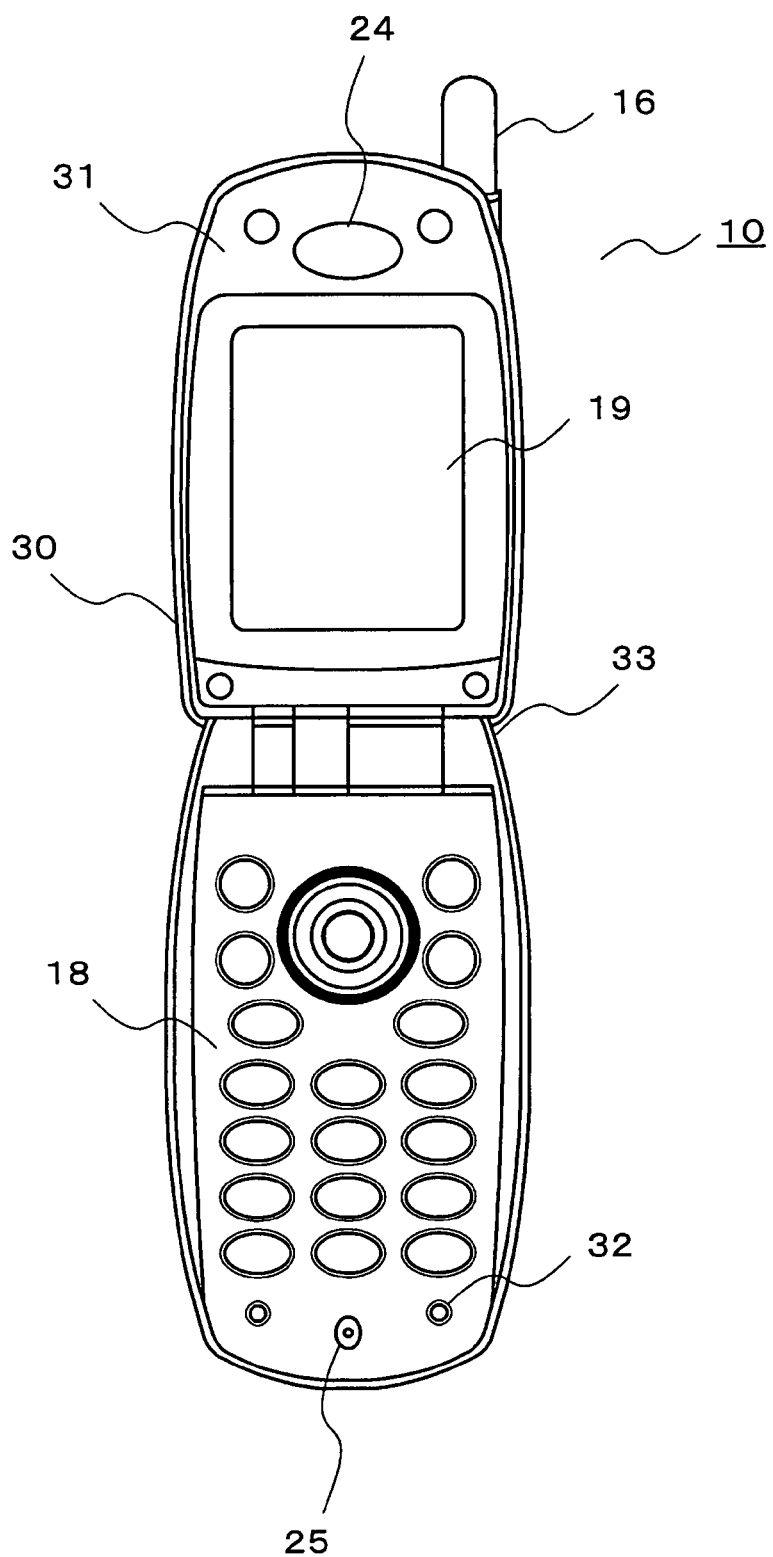
FIG. 2 is a view of the cellular phone in an unfolded state, viewed from a front side according to one embodiment of the present invention.
Figure 3:
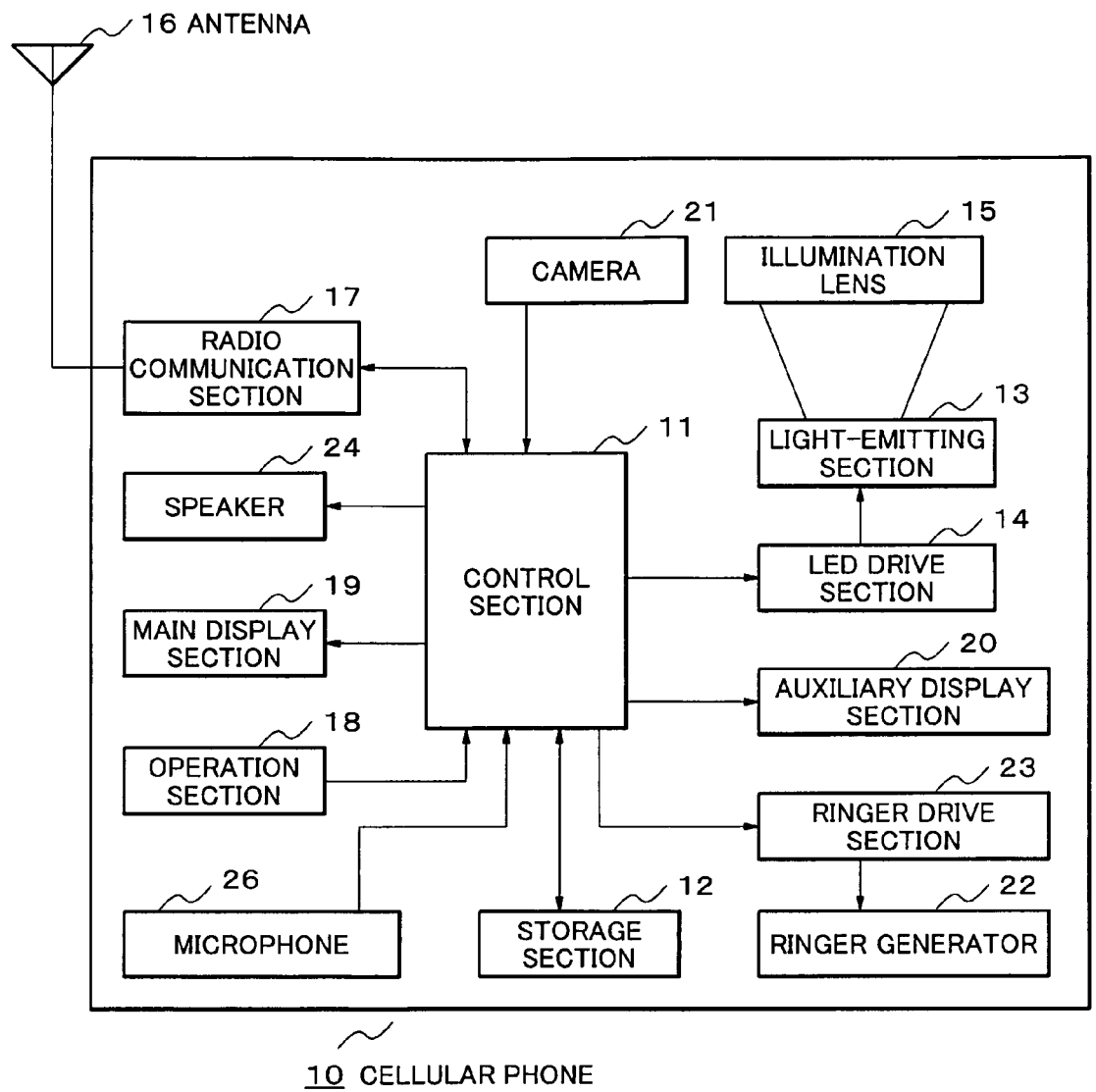
FIG. 3 is a block diagram illustrating a structure of the cellular phone according to one embodiment of the present invention.

FIG. 1 illustrates a back side of an upper-side housing 31 of a foldable cellular phone 10 which is in a folded state. FIG. 2 illustrates a front side of the foldable cellular phone 10 which is in an unfolded state. FIG. 3 is a block diagram illustrating a configuration example of the cellular phone 10.

As illustrated in FIG. 1 to FIG. 3, the cellular phone 10 of this example includes a foldable housing 30. Moreover, the cellular phone 10 includes a call function and a data communication function. Furthermore, the cellular phone 10 of this example may include a camera unit 21. As illustrated in FIG. 1, a lens 21a of this camera unit 21 is exposed to the back side of the upper-side housing.

As illustrated in FIG. 2, the housing 30 includes an upper-side housing 31 and a lower-side housing 32, which are connected to each other by a hinge section 33. The hinge section 33 rotatably connects the upper-side housing 31 to the lower-side housing 32 to make the cellular phone 10 foldable.

As illustrated in FIG. 3, the cellular phone 10 includes a control section 11, a storage section 12, a light source 13, an LED drive section 14, an illumination lens 15, an antenna 16 through which a radio wave is transmitted and received, a radio communication section 17, an operation section 18, a main display section 19, an auxiliary display section 20, a camera unit (hereinafter called "camera") 21, a ringer generator 22, a ringer drive section 23, a speaker 24 for outputting voice or sound, and a microphone 25 for inputting voice.

The control section 11 includes, for example, a Central Processing Unit (CPU) and various kinds of peripheral circuits (not shown), and controls an operation of each section of the cellular phone 10.

The storage section 12 includes storage media such as a Random Access Memory (RAM) or the like, and stores a control program and various kinds of data that are executed by the control section 11. Additionally, the storage section 12 may include a Read Only Memory (ROM) and the ROM may store a program for allowing the CPU to be operated as the control section.

The LED drive section 14 outputs a drive signal to the light source 13 (LED "Light-Emitting Diode") according to the control of the control section 11.

The light source 13 has an LED and emits light at a predetermined timing such as a call arrival time and a conversation time according to the progress of the drive signal from the LED drive section 14. The light source 13 includes at least one monochromatic light-emitting device. The light source 13 is preferably a multi-color light source having multiple kinds of LEDs each emitting a different color light. For example, the multi-color light source includes a red LED (R) that emits a red light, a green LED (G) that emits a green light, and a blue LED (B) that emits a blue light.

Regarding the outgoing light from the light source 13, an output power of the red light, an output power of the green light, an output power of the blue light, and a ratio of these powers can be changed according to the drive signal from the LED drive section 14.

The illumination lens 15 is placed on the back side of the upper-side housing 31 as illustrated in FIG. 1. The illumination lens 15 is attached in such a way that its light outgoing surface is exposed to an exterior of the upper-side housing 31. The illumination lens 15 causes an incident light from the light source 13 as a light source to pass and go out to an exterior of the cellular phone 10.

As is described in detail later, the incident light from the light source 13 is divided into multiple different directions by the light receiving portion of the illumination lens 15. After that, the divided light is outputted to the exterior of the housing from the light outgoing portion of the illumination lens 15.

The illumination structure is realized by the aforementioned illumination lens 15 and the light source 13.

The radio communication section 17 modulates and demodulates a signal according to a predetermined communication protocol. Specifically, the radio communication section 17 receives a radio signal through the antenna 16 and demodulates the signal. Also, the radio communication section 17 modulates a signal output from the control section 11 and transmits the radio signal through the antenna 16.

The operation section 18 includes input devices such as buttons for inputting a telephone number, and a shutter for instructing an image pickup by the camera 20. The operation section 18 outputs a signal to the control section 11 in response to a user's operation.

The main display section 19 is constituted of, for example, a Liquid Crystal Display (LCD). The main display section 19 is placed at a position which is an inner side of the housing 30, at the time of folding the cellular phone 10. The main display section 19 displays, for example, a standby screen, a function setting screen, etc.

The auxiliary display section 20 is constituted of, for example, a LCD. The auxiliary display section 20 is placed at a position, which is an outer side of the housing 30, at the time of folding the cellular phone 10.

The camera 21 has, for example, various functions with which a digital camera is provided, and picks up an image of a subject. The camera 21 includes an image pickup device such as a Charge Coupled Device (CCD), and supplies image data or video data to the control section 11.

The ringer drive section 23 outputs a drive signal to the ringer generator 21 according to control of the control section 11.

The ringer generator 22 causes the speaker 24 to output a ring tone according to the drive signal from the ringer drive section 23.

Figure 4:
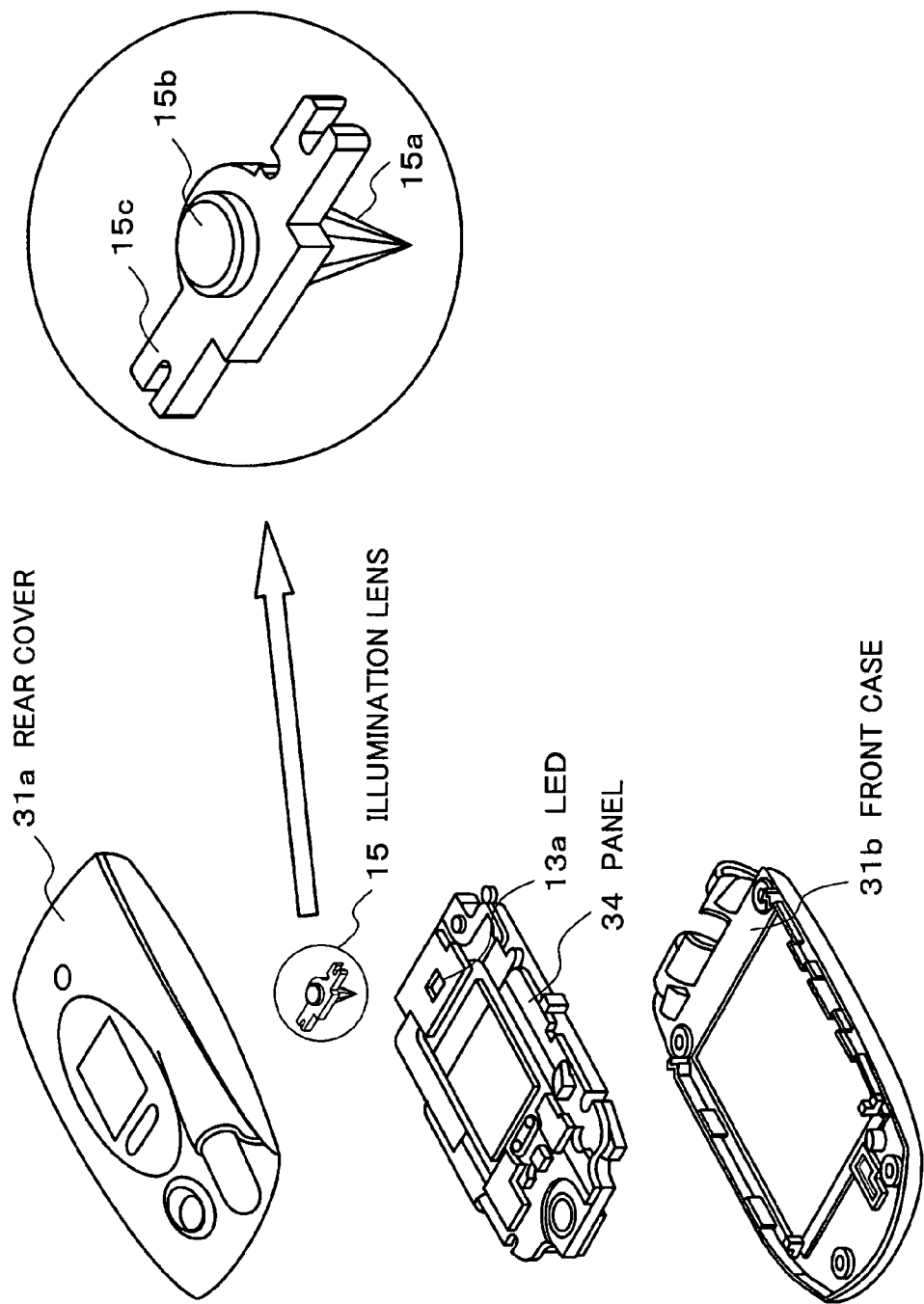
FIG. 4 is a perspective view illustrating an internal structure example of the upper-side housing and a configuration example of an illumination lens.

FIG. 4 is an exploded perspective view illustrating an inner structure of the upper-side housing 31 in the cellular phone 10. As illustrated in FIG. 4, the upper-side housing 31 includes a rear cover 31a and a front case 31b.

In the interior of the upper-side housing, there are provided a panel 34 on which an LED 13a as a part of the light source 13, various circuits and the illumination lens 15 are mounted.

An outgoing light from an LED 13a is output to the exterior of the housing 31 from a hole formed in the rear cover 31a through the illumination lens 15 when the upper-side housing 31 is assembled.

As illustrated in FIG. 4, the illumination lens 15 includes: a light receiving portion 15a that receives light from the LED 13a; a light outgoing portion 15b that outputs an incident light from the LED 13a to the exterior of the housing 30; and an attaching portion 15c for attaching the illumination lens 15 to the rear cover 31a. The illumination lens 15 is integrally formed of transparent or semi-transparent plastic through which light from the LED 13a propagates.

The illumination lens 15 is attached to the rear cover 31a in such a manner that an upper surface of the light outgoing portion 15b is exposed through the hole formed in rear cover 31a when the upper-side housing 31 is assembled.

In attaching the illumination lens 15 to the rear cover 31a, an assembly operator inserts two concave portions (see FIG. 4) formed in the attaching portion 15c into two projecting portions (not shown) formed in the rear cover 31a and bonds the inserted portion by thermo-compression. It is of course possible to attach the illumination lens 15 to the rear cover 31a by the other known methods.

Figure 5:
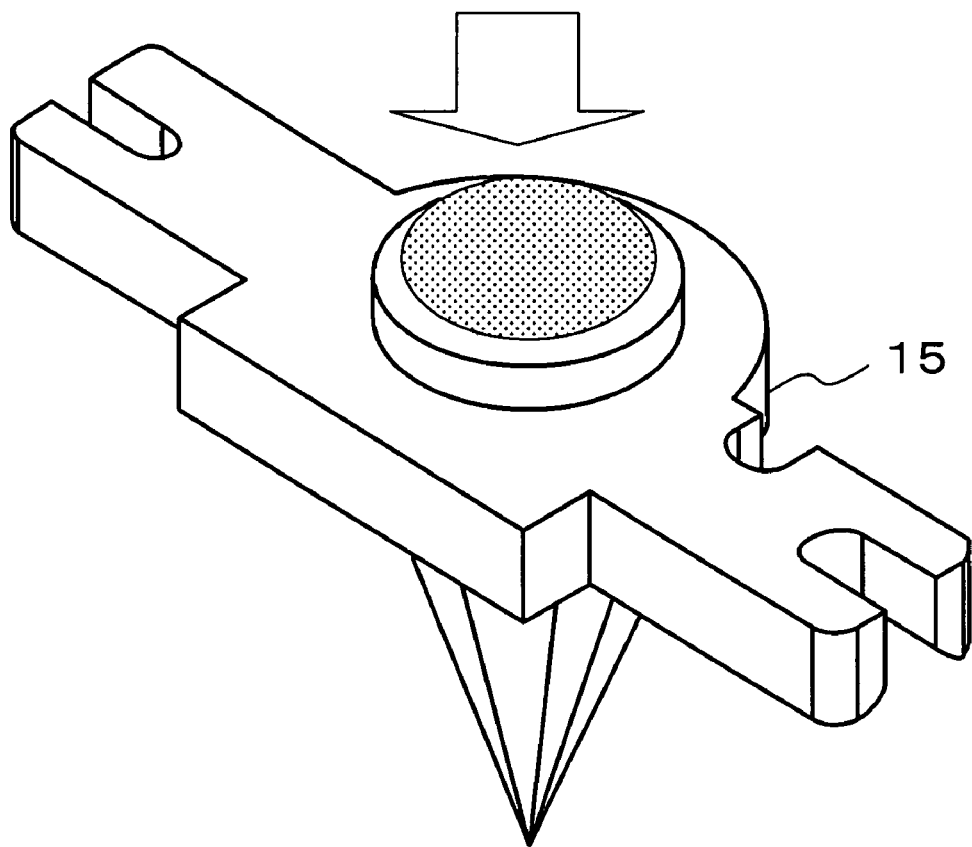
FIG. 5 is a perspective view illustrating an example in which the illumination lens is subjected to surface decoration treatment.

FIG. 5 is a perspective view illustrating one example of the illumination lens 15. In this example, the surface of the light outgoing portion 15b of the illumination lens 15 is subjected to a surface decoration treatment. As the surface decoration treatment, half-mirror evaporation, dichroic mirror evaporation, transparent coating, printing, and the like may be used.

When the surface of the light outgoing portion 15b is subjected to half-mirror evaporation, light from one direction (e.g., light from the exterior of the housing 30) is reflected by a portion subjected to the surface decoration treatment, while light from the other direction (e.g., light from the LED 13a) is directly transmitted through the surface of the light outgoing portion.

Moreover, when the surface of the light outgoing portion 15b is subjected to dichroic mirror evaporation, light in a predetermined wavelength region is reflected by the surface of the light outgoing portion 15b and light in the other wavelength region is transmitted through the surface of the light outgoing portion.

When the surface of the light outgoing portion 15b is subjected to transparent coating, a transmission characteristic differs for each wavelength. In this case, transparency of the illumination lens is reduced by a coating color. The transparent coating is performed by coating with dye such as process ink. Additionally, the surface decoration treatment is performed to such a degree that light from the light source can be transmitted (a predetermined transmittance and more ((e.g., 30%, 50%, 70) may be ensured) and the interior of the housing 30 cannot be easily visually recognized.

The aforementioned surface decoration treatment allows improvement in decoration of the cellular phone 10 at the time of non-illumination. Moreover, the transmittance of the illumination lens is reduced by the surface decoration treatment. The reduction in transmittance prevents the interior of the housing 30 from being visually recognized from the exterior of the housing 30 of the cellular phone 10 through the illumination lens 15 at the time of non-illumination.

Furthermore, as illustrated in FIG. 5, the light receiving portion 15a of the illumination lens 15 of this example receives the incident light from the LED 13a using a plurality of surfaces. Accordingly, the light receiving portion 15a takes a shape cut to a polyhedron. For example, the light receiving portion 15a may be polyhedral cone-shaped or diamond-shaped.

Figure 6:
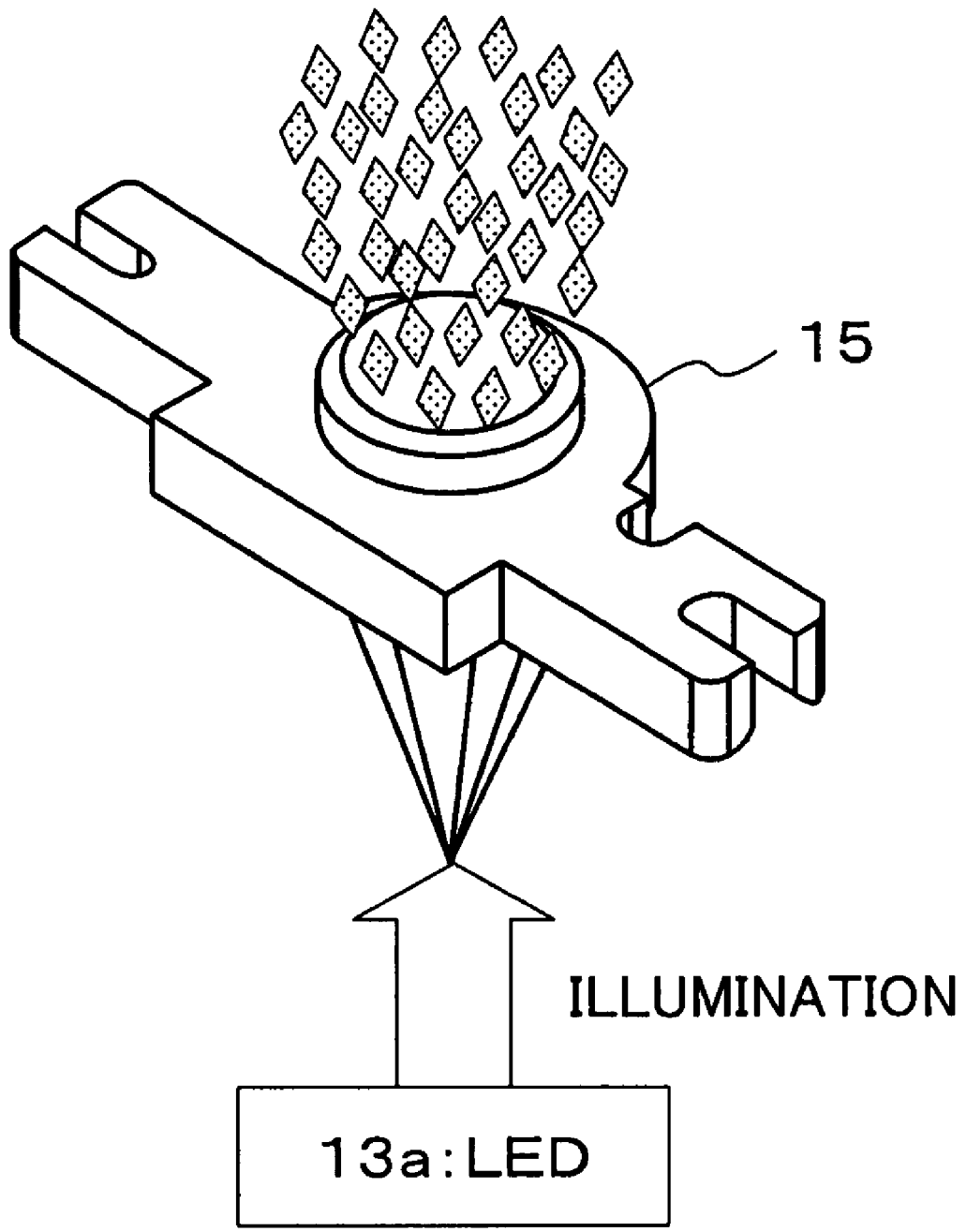
FIG. 6 is a view illustrating a state in which an incident light from an LED passes through the illumination lens and goes out.
Figure 7:
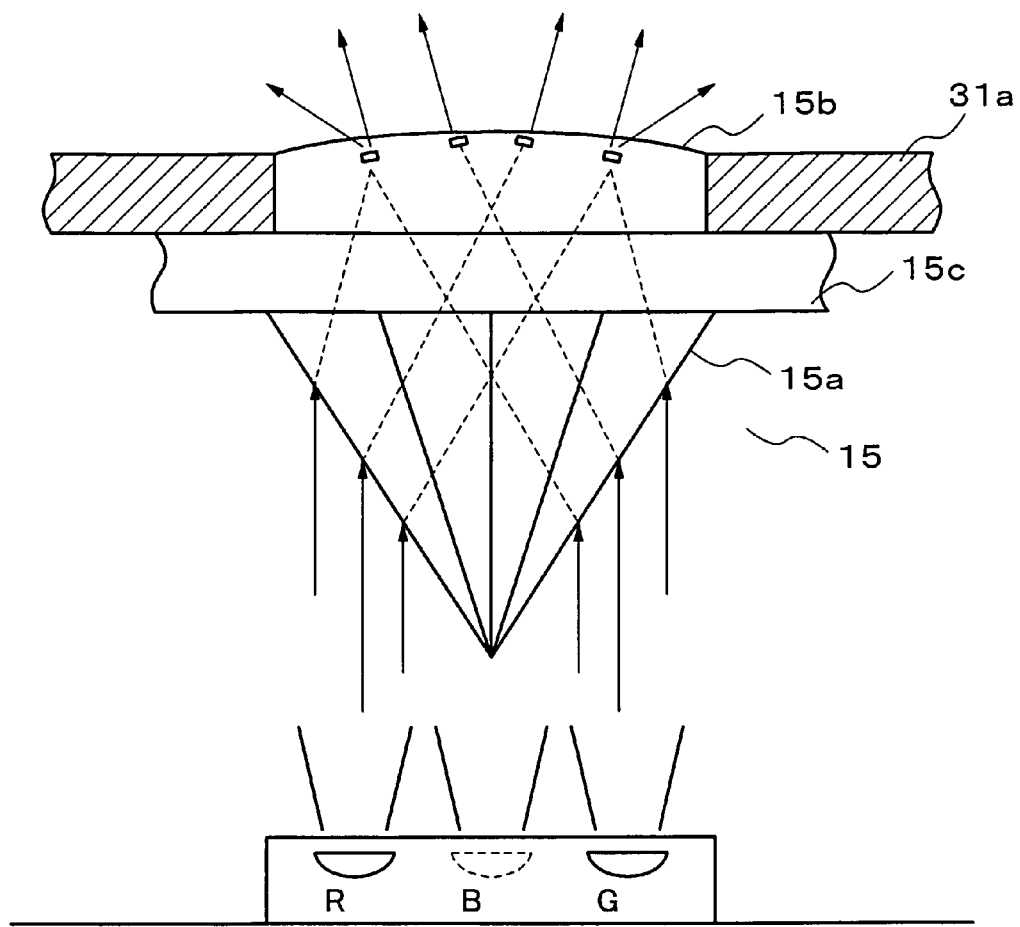
FIG. 7 is a view illustrating a manner in which an incident light from an LED propagates through an interior of the illumination lens.

FIG. 6 illustrates a state in which the incident light from the LED 13a is transmitted through the illumination lens 15 and outputted. FIG. 7 illustrates a manner in which the incident light from the LED 13a is refracted in the interior of the illumination lens 15.

As illustrated in FIG. 7, the incident light from the LED 13a of each color (R, G, B) that the light source 13 has is incident upon the light receiving portion 15a of the illumination lens 15. Since the light receiving portion 15a is cut to a polyhedron, light of each color is incident thereupon in such a manner to straddle over a different plane surface of the light receiving portion. As a result, the incident light is divided into a plurality of light, each of which propagates in a different direction. Since the LED of each color is placed at a different location, the manner of division of the incident light of each color differs for each color. As illustrated in FIG. 7, each divided light propagates through a different path in the illumination lens, and outputs from the light outgoing portion 15 to the exterior of the housing.

Accordingly, when the owner sees the light outputted through the illumination lens 15, it looks as if the light outgoing portion 15b emitted light in a state that light of multiple colors were mixed variously. For example, as illustrated in FIG. 6, the owner can see the light outgoing portion shining as if light were shone on a jewel. Additionally, in FIG. 7, the red LED (R), the blue LED (B) and the green LED (G) are arranged one for each, and three LEDs in total are one-dimensionally arranged. However, the number of LEDs is not limited to three. LEDs may be two-dimensionally arranged. The "way of different arrangement" of multiple LEDs brings about a different illumination effect.

Figure 8:
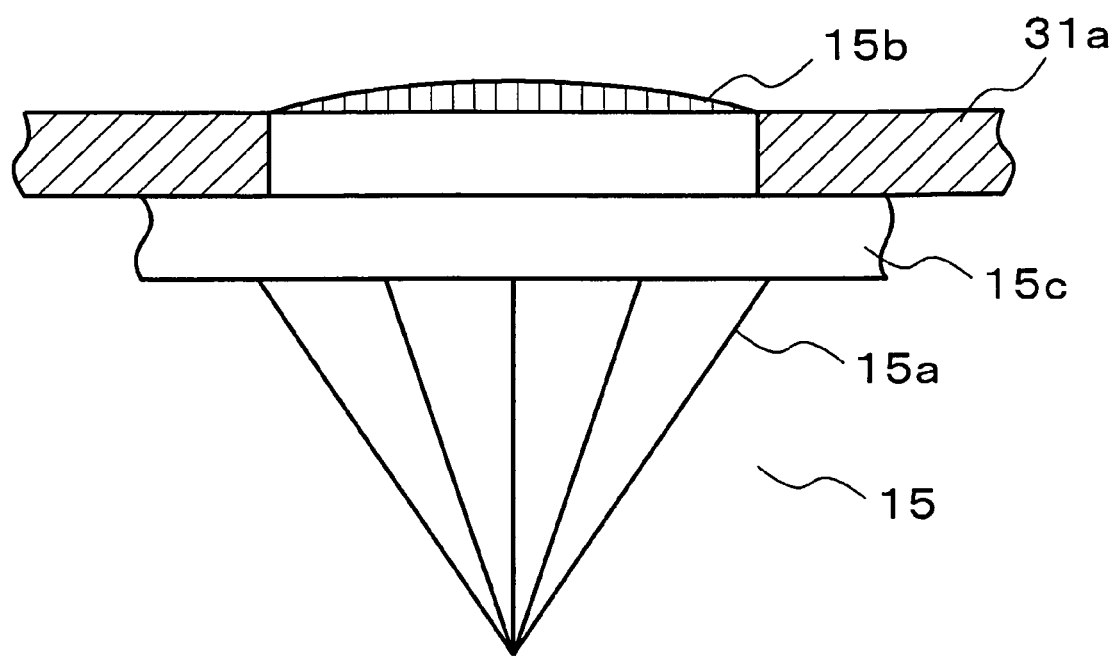
FIG. 8 is a view illustrating an example in which a surface of a light outgoing portion of the illumination lens is subjected to decoration treatment.

FIG. 8 illustrates the illumination lens in which the surface of the light outgoing portion 15b is subjected to the decoration treatment. Incidentally, in FIG. 7 and FIG. 8, the surface of the light outgoing portion 15b is formed as a part of a spherical surface.

Figure 9:
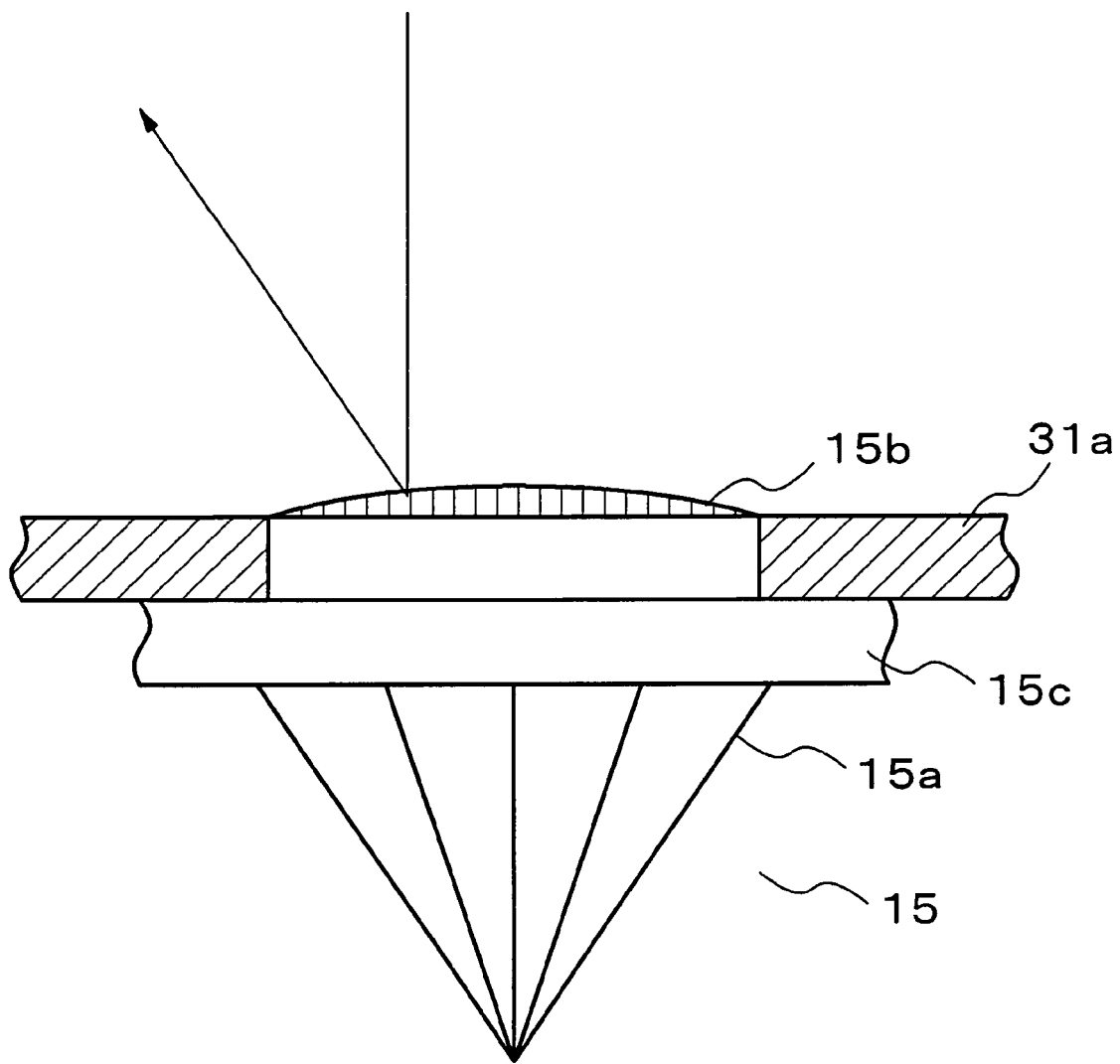
FIG. 9 is a view illustrating a manner in which an incident light from an exterior of a housing is reflected by a decoration-treated portion of the illumination lens.

FIG. 9 illustrates a manner in which light from the exterior of the housing 30 is reflected by the decoration-treated portion of the illumination lens 15 of FIG. 8. In the example illustrated in FIG. 9, it is assumed that the light outgoing portion 15b of the illumination lens 15 is subjected to half-mirror evaporation. Some of light arrived at the surface of the light outgoing portion 15b of the illumination lens 15 from the exterior of the housing 30 are reflected by the decoration-treated portion and the remaining light is transmitted through the interior of the illumination lens 15 due to the decoration treatment using half-mirror evaporation. Thus, since some of light arrived at the illumination lens 15 from the exterior of the housing 30 are reflected by the decoration-treated surface of the light outgoing portion 15b, the decoration treatment reduces the transparency of the illumination lens. As a result, the interior of the housing 30 cannot be easily visually recognized. If it is permitted that the interior of the housing is visually recognized through the illumination lens, the decoration treatment does not, of course, have to be performed on the surface of the light outgoing portion.

Additionally, when the light arrives at the surface of the light outgoing portion 15b of the illumination lens 15 from the exterior of the housing 30 after a decoration treatment is performed using dichroic mirror evaporation, light components in a predetermined wavelength region are reflected by the decoration-treated portion, while light components in the other wavelength region are transmitted through the interior of the illumination lens 15. Accordingly, as compared with the case in which no decoration treatment is performed, the interior of the housing 30 cannot be easily visually recognized. Moreover, when a decoration treatment is performed using dichroic mirror evaporation, light in a specific wavelength region is reflected by the decoration-treated portion (surface of the light outgoing portion 15b), thereby making it possible to obtain a decoration effect as if a ruby (red) and a sapphire (blue) were buried in the housing 30.

As explained above, according to the aforementioned embodiment, at the time when the incident light from the light-emitting device (LED 13a) is incident upon the illumination lens 15 or the light transmitted through the illumination lens 15 is output, the light is refracted in multiple directions, so that the illumination effect can be improved. Furthermore, the decoration treatment is performed on the surface of the light outgoing portion, thereby the interior of the housing 30 cannot be easily visually recognized from the exterior.

Namely, in the aforementioned embodiment, the incident light from the light-emitting device can be output in such a way that the incident light is refracted in the multiple directions and spread out. The light emitted through the illumination lens 15 becomes light in which various colors are mixed and which changes its state of mixed colors. Accordingly, the aforementioned embodiment can achieve the illumination as if the jewel shone to make it possible to improve the illumination effect.

The conventional cellular phone notifies the cellular phone owner of the incoming call and the like by emitting light from the light source. As is obvious from the aforementioned explanation, the use of the illumination mechanism of the aforementioned embodiment allows improvement in the illumination effect without increasing the size in the cellular phone. In other words, the illumination effect can be improved with a simple structure having only the conventionally mounted light source and the illumination lens 15 subjected to polyhedral lens cutting.

Moreover, the structure in which the surface decoration treatment is performed on the surface of the light outgoing portion 15b of the illumination lens 15 is used in the part of the aforementioned preferred embodiment. Accordingly, even when the light is not emitted through the illumination lens 15, the decoration effect can be improved only by mounting the illumination lens 15 on the cellular phone 10. Then, the illumination lens 15 having the decoration effect emits light while changing the color of light in which various colors are mixed, thereby enabling to perform unpredictable illumination. Namely, characteristic light-emission from the illumination lens 15, which seems to be simply used as a decoration, makes it possible to perform unpredictable illumination.

Moreover, in the aforementioned embodiment, the illumination lens 15 is structured to be attached to the housing 30 in such a manner that the surface of the light outgoing portion 15b is exposed through the hole formed in rear cover 31a of the upper-side housing 31. This allows the owner to visually recognize light-emission at an easily viewable position even if the cellular phone 10 is in a non-used state (for example, folded state).

Additionally, the light source 13 of this example is structured to have the multi-color light source including three LEDs that emit three primary colors of red, green, and blue, respectively. Light emitted through the illumination lens 15 can be changed to various colors using light of multiple colors outputted from the light source 13, thereby making it possible to use various illumination patterns.

By combining light of multiple colors, illumination patterns of multiple kinds can be created. For example, a different illumination pattern can be created using combinations of light of multiple colors and offered to the user according to a calling party (caller) on an incoming call. In this case, color light decision data is prepared in advance and stored in the storage section 12. In the color light decision data, each of calling party's phone numbers and each of colors of light, which is used to create the illumination pattern, are associated with each other. Then, when a call arrives, the control section 11 decides a color of light, which is used to create the illumination pattern, based on the color light decision data.

Moreover, the illumination pattern may be used according to the birth month of the cellular phone owner. Namely, an illumination pattern is created using light with the same color as the corresponding birthstone and offered to the owner during his/her birth month. In this case, the owner stores color light decision data in the storage section 12 in advance. In the color light decision data, each of names of months, January to December, prestored in the storing section 12 and each of colors of light, which is used to create the illumination pattern, are associated with each other. The owner stores his/her birthday in the storage section 12 in advance. Then, when a call arrives, the control section 11 judges whether the incoming call corresponds to the owner's birth month based on setting information stored in the storage section 12. When the incoming call corresponds to the owner's birth month, the control section 11 decides that light with the same color as the owner's birthstone is used in the illumination pattern based on the color light decision data.

In the aforementioned preferred embodiment, the light receiving portion of the illumination lens 15 takes a shape cut to a polyhedron. However, any shape may be taken if the light receiving portion can divide the light supplied by the light source 13 in multiple directions and outputs the divided lights as exemplified in FIG. 10.

Figure 10:
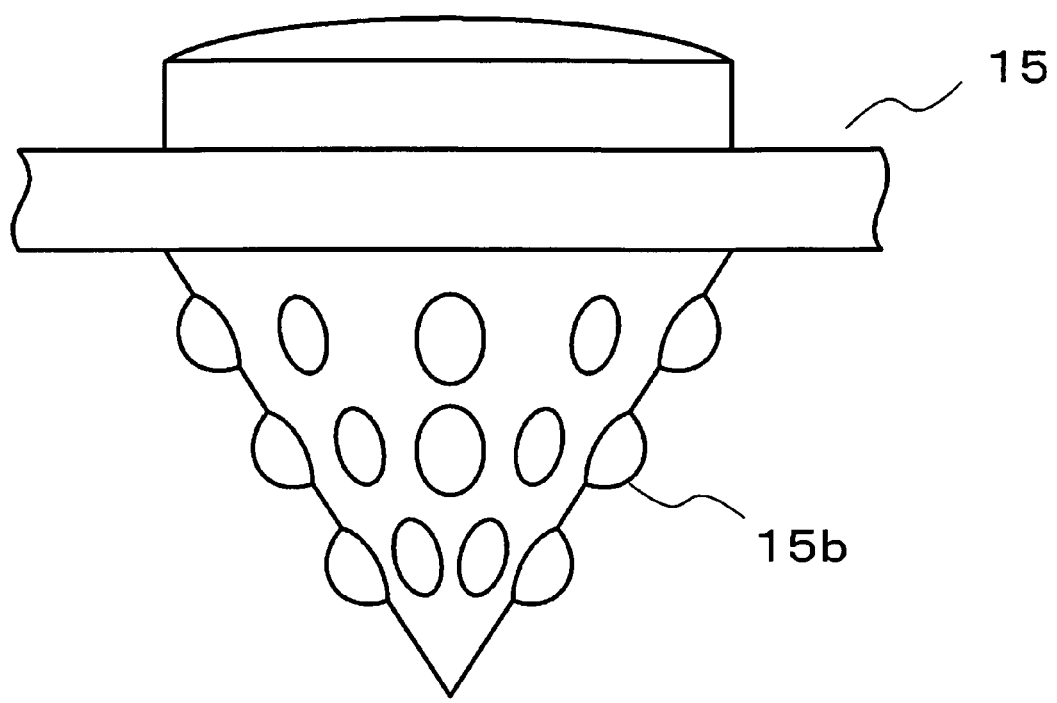
FIG. 10 is a view illustrating an illumination lens in which multiple projections are formed on a surface of a light receiving portion.

FIG. 10 is a view illustrating another structure of an illumination lens. The illumination lens in FIG. 10 is formed to have a shape in which multiple dome-convex portions 15b are formed on the surface of the light receiving portion. The structure of this light receiving portion can also divide the light from the light source 13 in the multiple directions and output the divided light, thereby bringing about the noble illumination effect. Incidentally, in FIG. 10, the surface shape of the light receiving portion excepting the convex portions does not have to take a shape cut to a polyhedron, and conic and cylindrical shapes may be also used.

Figure 11:
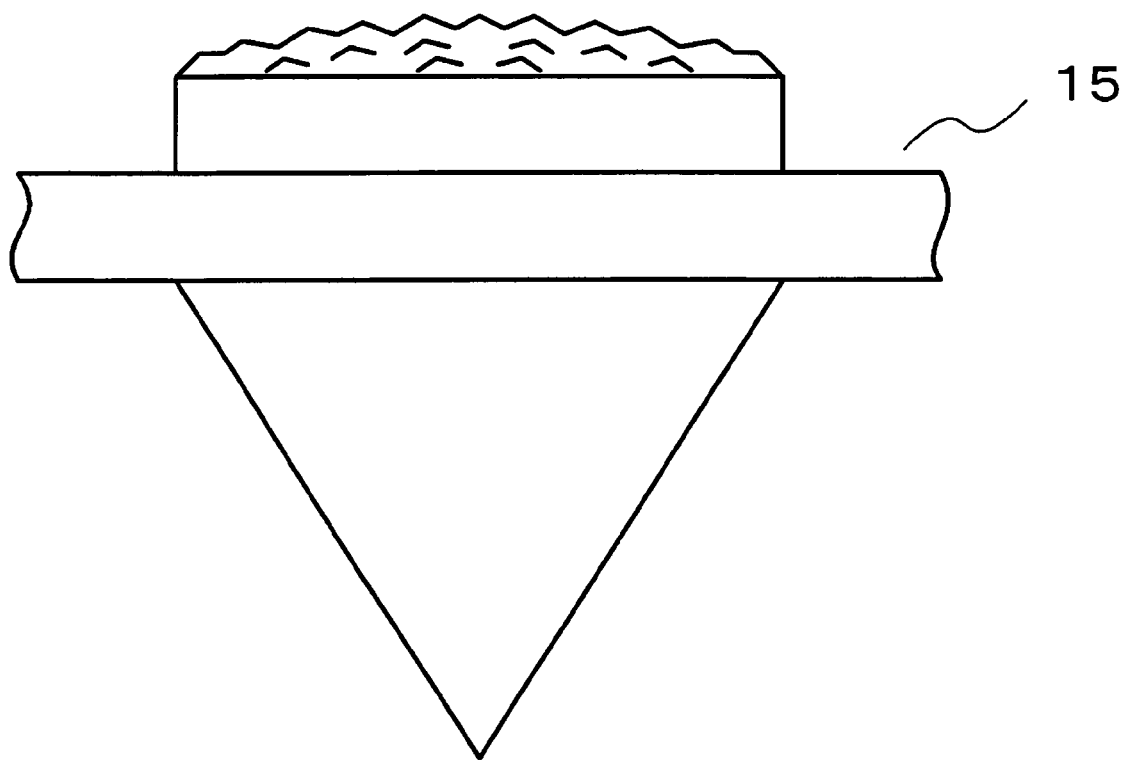
FIG. 11 is a view illustrating another example of an illumination lens in which a surface of a light outgoing portion is non-planar.

FIG. 11 is a view illustrating further another structure of an illumination lens. The illumination lens in FIG. 11 is formed to have a non-planar shape in which multiple convex portions (e.g., pyramid and mountain-like convex portions) are formed on the surface of the light outgoing portion. The illumination lens with this structure can also divide the light in the multiple directions and output the divided light, thereby bringing about the similar illumination effect.

In addition to the shapes illustrated in FIG. 10 and FIG. 11, any shape may be taken if the surface of the light receiving portion or that of the light outgoing portion of the illumination lens is formed to have concave and convex portions such as a shape in which multiple notches are formed in the surface of the light receiving portion of the illumination lens. Incidentally, a shape may be taken, which has the concave and convex portions on both the light receiving portion and the light outgoing portion of the illumination lens.

Moreover, the aforementioned embodiment shows the structure in which the decoration treatment is performed on the surface of the light outgoing portion 15b of the illumination lens 15. However, a structure may be used which performs the decoration treatment on the other portion. For example, the decoration treatment may be performed on the surface of the light receiving portion 15a of the illumination lens 15.

Figure 12:
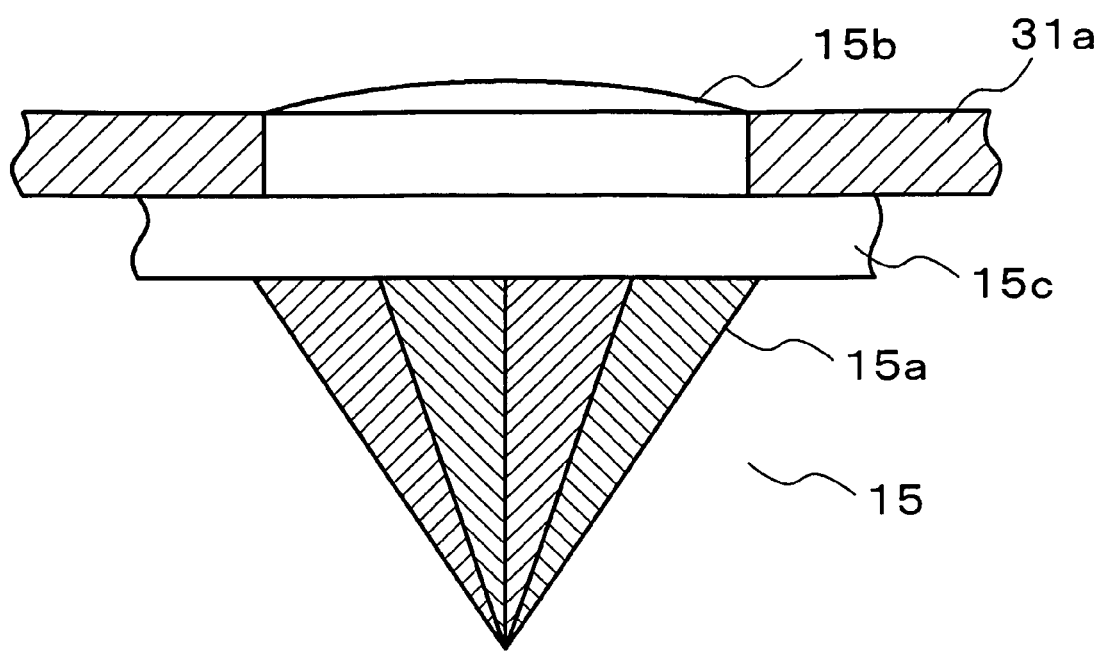
FIG. 12 is a view illustrating an illumination lens in which a light receiving portion is subjected to decoration treatment.

FIG. 12 illustrates the illumination lens in which the surface of the light receiving portion 15a is subjected to the decoration treatment. The decoration treatment on the surface of the light receiving portion can be performed by the same method as the already-explained decoration treatment on the surface of the light outgoing portion.

Figure 13:
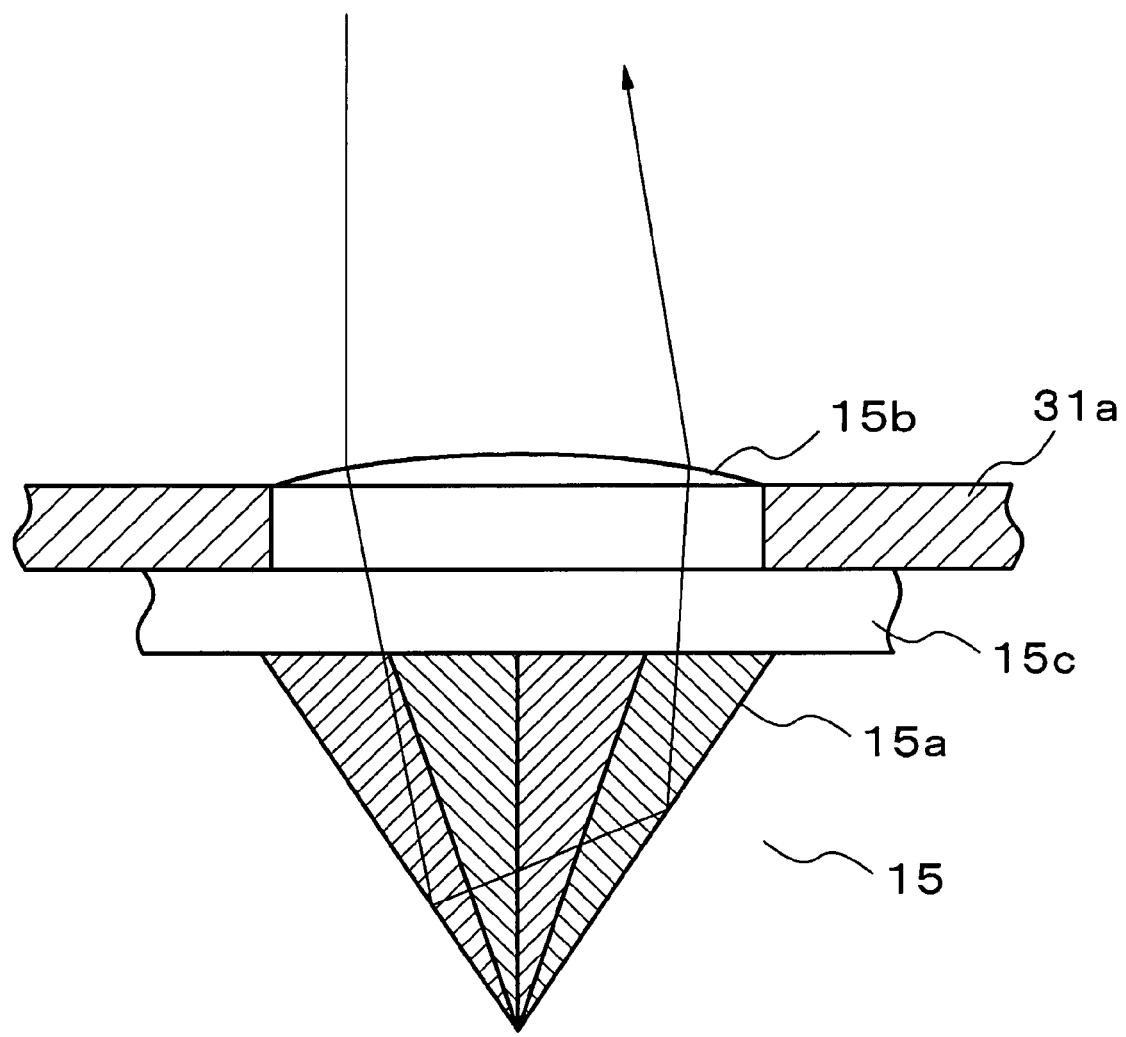
FIG. 13 is a view illustrating a manner in which light from an exterior of a housing is reflected by a decoration-treated portion of the light receiving portion of the illumination lens of FIG. 12.

FIG. 13 illustrates a manner in which the decoration-treated portion of the illumination lens of FIG. 12 reflects the light from the exterior of the housing 30. The light, which is incident upon the surface of the light outgoing portion 15b from the exterior of the housing 30, is refracted at the surface and enters the lens 15. Then, some of light are reflected by the surface of the light receiving portion 15a. Some of the reflected light are further reflected by the decoration-treated portion. Such reflections may be repeated several times. Thereafter some of the light from the exterior of the housing arrive at the surface of the light outgoing portion 15b, refracted at the surface of the light outgoing portion 15b, and outputs to the exterior of the housing 30. Also, the light, which is incident upon the surface of the light outgoing portion 15b from the exterior of the housing 30 and which is not reflected by the surface of the light receiving portion 15a, travels toward the panel 34.

As described above, the structure in which the decoration treatment is performed on the surface of the light receiving portion 15a also prevents the interior of the housing 30 from being visually recognized as compared with the structure in which no decoration treatment is performed thereon.

Moreover, regarding the structure in FIG. 12, since the surface of the light receiving portion 15a is subjected to the surface decoration treatment, even if the light is not emitted from the light source, the decoration effect can be improved only by mounting the illumination lens 15 on the cellular phone 10. Then, when the light is emitted from the light source, the illumination lens 15 emits light while changing the color of light in which various colors are mixed, thereby bringing about unpredictable illumination. Namely, the illumination lens 15, which seems to be simply used as a decoration, provides unpredictable illumination on reception of the light from the light source.

Figure 14:
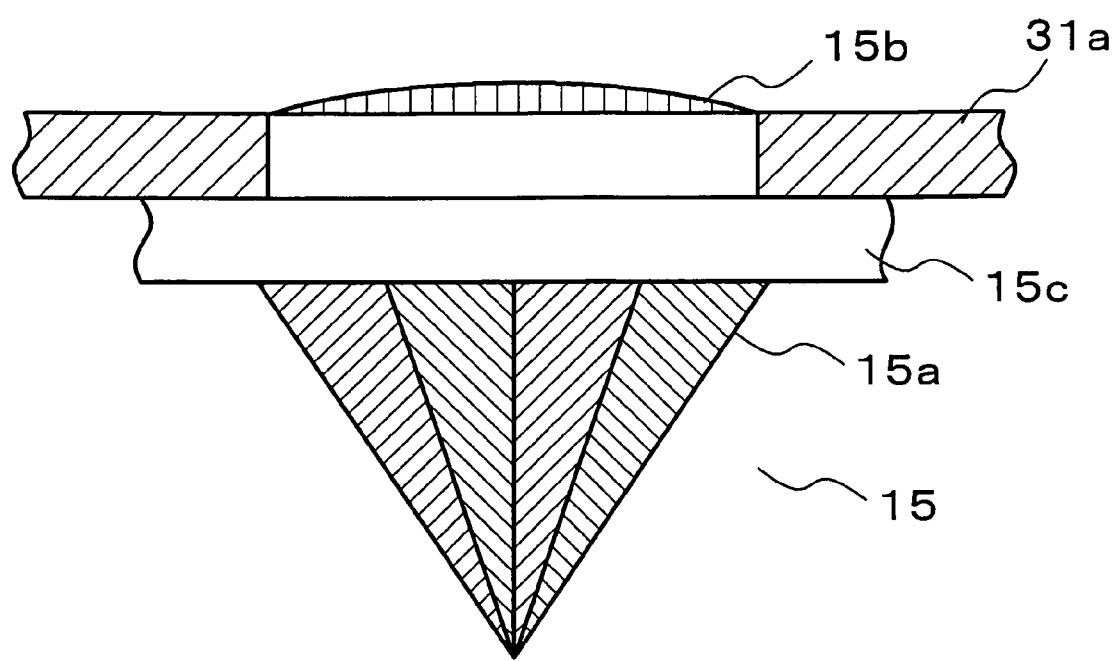
FIG. 14 is a view illustrating an example of an illumination lens in which a light receiving portion and a light outgoing portion are subjected to decoration treatment.

Moreover, the illumination lens may have a structure in which the decoration treatment is performed on both the surfaces of the light outgoing portion 15b and the light receiving portion 15a. An example of this structure is illustrated in FIG. 14. In the case of this structure, the light from the exterior of the housing 30 is reflected by both the surfaces of the light outgoing portion 15b and the light receiving portion 15a. Only the light, which is not reflected by both surfaces, transmits through the illumination lens 15 and travels toward the panel 34. Accordingly, the illumination lens of FIG. 14 also makes it difficult for the owner to visually recognize the interior of the housing 30 as compared with the structure in which no decoration treatment is performed thereon.

Additionally, in the aforementioned embodiment, three LEDs, which emit light of three colors of red, green, and blue, respectively, are used as the light sources. In the present invention, multiple LEDs, which emit light of other colors, may be used. For example, multi-colors may be achieved using four colors of CMYK (Cyan, Magenta, Yellow and Black), instead of light of colors of R, G and B in the aforementioned embodiment.

Moreover, in the aforementioned embodiment, the LEDs are used as the light sources. Other kinds of light-emitting devices such as an illuminant using EL (Electro Luminescence) device and an illuminant used in FED (Field Emission Display) may be used as the light sources.

Furthermore, in the aforementioned embodiment, the light source is structured to be fixedly mounted in the panel 34. In the present invention, a function for moving the light source may be added. Namely, a structure may be used which moves the light source right and left, up and down, and back and forth. In this case, the electronic device such as a cellular phone further includes a light source moving controller that moves the light source. Then, under control of the controller 11, the light source moving controller outputs a drive signal to a light source drive mechanism such as a motor and an actuator to move the light source right and left, up and down, and back and forth. Thus, the light source emits light while moving, thereby making it possible for the electronic device to offer an illumination pattern that changes its design in time.

Additionally, in the illumination structure, the illumination lens 15 may be structured to be moved in various directions instead of moving the light source. In this case, the electronic device further includes a lens operation controller that operates the illumination lens 15 and a lens drive mechanism such as a motor and an actuator. Then, under control of the controller 11, the lens operation controller outputs a drive signal to the lens drive mechanism to move the illumination lens 15 right and left, up and down, and back and forth, and/or rotate the illumination lens 15. Thus, the light source emits light while the illumination lens 15 is moved, thereby making it possible to realize various illumination patterns.

Moreover, instead of only either one of the light source and the illumination lens 15, both the light source and the illumination lens 15 may be, of course, operated.

Additionally, in the aforementioned embodiment, the structure which equips the cellular phone 10 with the illumination structure is used. The present invention can be, however, easily applied to the other mobile electronic devices such as a PHS (Personal Handyphone System), a PDA (Personal Digital Assistants), and a portable karaoke.

Moreover, the present invention may be applied to not only the mobile electronic device but also e.g., a stand-alone illumination device having an illumination function as a main function.

Furthermore, the present invention can be applied to not only the mobile electronic device but also the other electronic devices such as a toy having an illumination function, a fixed telephone and etc.

Additionally, the aforementioned embodiment has explained the foldable cellular phone 10 as an example. The present invention can be, of course, applied to a non-foldable cellular phone.

While this invention has been described in connection with certain exemplary embodiments, it is to be understood that the subject matter encompassed by way of this invention is not be limited to those specific embodiments. On the contrary, it is intended for the subject matter of the invention to include all alternatives, modifications and equivalents as can be included with the sprit and scope of the following claims. Further, the inventor's intent is to retain all equivalents even if the claims are amended during prosecution.

What is claimed is:

1. An illumination structure comprising:
   a light source that emits light in at least one wavelength band; and
   an illumination lens having a light receiving portion and a light outgoing portion wherein an incident light from the light source is divided in a plurality of different directions by the light receiving portion and the divided lights are emitted in a plurality of different directions from the light outgoing portion, wherein the illumination lens is formed in such a manner that the surface of the light receiving portion is nonplanar-shaped; wherein the decoration treatment is performed by transparent coating, dichroic mirror evaporation or half-mirror evaporation; and wherein at least some of light being incident from the surface of the light outgoing portion is reflected by a portion subjected to the decoration treatment.

2. The illumination structure according to claim 1, wherein a surface of the light receiving portion is subjected to a decoration treatment to reduce transparency of the illumination lens.

3. The illumination structure according to claim 1, wherein a plurality of dome-like projections are formed on the surface of the light receiving portion.

4. The illumination structure according to claim 1, wherein the illumination lens is formed in such a manner that the surface of the light outgoing portion is nonplanar-shaped.

5. The illumination structure according to claim 1, wherein the surface of the light receiving portion is cone-shaped, and wherein the incident light on the surface of the light receiving portion is incident at an angle that is smaller angle than a right angle.

6. The illumination structure according to claim 1, wherein the surface of the light receiving portion includes: a) a plurality of concave or convex portions, b) a plurality of notches, or c) a shape cut to a polyhedron having a plurality of different-angled light-receiving surfaces.

7. The illumination structure according to claim 1, wherein the light receiving portion has a prism shape with a plurality of surfaces at different angles with respect to each other, in which the light output from the light source is incident on at least two of the plurality of surfaces so as to cause the light output from the light source to be divided into a plurality of light each of which propagates in a different direction.

8. An electronic device having an illumination structure equipped therein, said illumination structure comprising:
a light source that emits light in at least one wavelength band; and an illumination lens having a light receiving portion and a light outgoing portion wherein an incident light from the light source is divided in a plurality of different directions by the light receiving portion and the divided lights are emitted in a plurality of different directions from the light outgoing portion, wherein the illumination lens is formed in such a manner that the surface of a light receiving portion is nonplanar-shaped; wherein the decoration treatment is performed by transparent coating, dichroic mirror evaporation or half-mirror evaporation; and wherein at least some of light being incident from the surface of the light outgoing portion is reflected by a portion subjected to the decoration treatment.

9. The electronic device according to claim 8, wherein the surface of the light receiving portion is subjected to a decoration treatment to reduce transparency of the illumination lens.

10. The electronic device according to claim 9, wherein the decoration treatment is performed by transparent coating, dichroic mirror evaporation or half-mirror evaporation; and
wherein at least some of light being incident from the surface of the light outgoing portion is reflected by a portion subjected to the decoration treatment.

11. The electronic device according to claim 8, wherein a plurality of dome-like projections are formed on the surface of the light receiving portion.

12. The electronic device according to claim 8, wherein the illumination lens if formed in such a manner that the surface of the light outgoing portion is nonplanar-shaped.

13. The electronic device according to claim 8, wherein the surface of the light receiving portion is cone-shaped, and wherein the incident light on the surface of the light receiving portion is incident at an angle that is smaller angle than a right angle.

14. The electronic device according to claim 8, wherein the surface of the light receiving portion includes: a) a plurality of concave or convex portions, b) a plurality of notches, or c) a shape cut to a polyhedron.

15. The electronic device according to claim 8, wherein the light receiving has a prism shape with a plurality of surfaces at different angles with respect to each other, for dividing the incident light in the plurality of different directions, and which is output by the light outgoing portion as the plurality of the divided light.

16. An illumination lens comprising: a light receiving portion that receives an incident light in at least one wavelength band and divides the incident light in a plurality of different directions to cause the divided light to be incident upon an interior; and a light outgoing portion that emits a plurality of the divided light in a plurality of different directions, wherein the surface of the light receiving portion is subjected to a decoration treatment to reduce transparency of the illumination lens; wherein the decoration treatment is performed by transparent coating, dichroic mirror evaporation or half-mirror evaporation; and wherein at least some of light being incident from the surface of the light outgoing portion is reflected by a portion subjected to the decoration treatment.

17. The illumination lens according to claim 16, wherein the illumination lens is formed in such a manner that a surface of the light receiving portion is nonplanar-shaped.

18. The illumination lens according to claim 16, wherein the decoration treatment is performed by transparent coating, dichroic mirror evaporation or half-mirror evaporation; and
wherein at least some of light being incident from a surface of the light outgoing portion is reflected by a portion subjected to the decoration treatment.

19. The illumination lens according to claim 16, wherein the surface of the light receiving portion is cone-shaped, and wherein the incident light on the surface of the light receiving portion is incident at an angle that is smaller angle than a right angle.

20. The illumination lens according to claim 16, wherein the surface of the light receiving portion includes: a) a plurality of concave or convex portions, b) a plurality of notches, or c) a shape cut to a polyhedron.

21. The illumination lens according to claim 16, wherein the light receiving has a prism shape with a plurality of surfaces at different angles with respect to each other, for dividing the incident light in the plurality of different directions, and which is output by the light outgoing portion as the plurality of the divided light.

22. An illumination lens comprising:
a light receiving portion that receives an incident light in at least one wavelength band and divides the incident light in a plurality of different directions to cause the divided light to be incident upon an interior; and a light outgoing portion that emits a plurality of the divided light in a plurality of different directions, wherein the illumination lens is formed in such a manner that a surface of the light receiving portion is non-planar-shaped, and wherein a plurality of dome-like projections are formed on the surface of the light receiving portion; wherein the decoration treatment is performed by transparent coating, dichroic mirror evaporation or half-mirror evaporation; and wherein at least some of light being incident from the surface of the light outgoing portion is reflected by a portion subjected to the decoration treatment.

23. The illumination lens according to claim 22, wherein a surface of the light receiving portion is subjected to a decoration treatment to reduce transparency of the illumination lens,
wherein the decoration treatment is performed by transparent coating, dichroic mirror evaporation or half-mirror evaporation; and
wherein at least some of light being incident from the surface of the light outgoing portion is reflected by a portion subjected to the decoration treatment.

24. An illumination lens comprising: a light receiving portion that receives an incident light in at least one wavelength band and divides the incident light in a plurality of direction to cause the divided light to be incident upon an interior; and a light outgoing portion that emits a plurality of the divided light in a plurality of different directions, wherein the illumination lens is formed in such a manner that a surface of the light receiving portion is non-planar-shaped, and wherein the illumination lens is formed in such a manner that a surface of the light outgoing portion is nonplanar-shaped; wherein the decoration treatment is performed by transparent coating, dichroic mirror evaporation or half-mirror evaporation; and wherein at least some of light being incident from the surface of the light outgoing portion is reflected by a portion subjected to the decoration treatment.

25. The illumination lens according to claim 24, wherein a surface of the light receiving portion is subjected to a decoration treatment to reduce transparency of the illumination lens, wherein the decoration treatment is performed by transparent coating, dichroic mirror evaporation or half-mirror evaporation; and wherein at least some of light being incident from the surface of the light outgoing portion is reflected by a portion subjected to the decoration treatment.

* * * * *

UNITED STATES PATENT AND TRADEMARK OFFICE
CERTIFICATE OF CORRECTION

| | | |
|---|---|---|
| PATENT NO. | : 8,159,750 B2 | |
| APPLICATION NO. | : 12/078245 | |
| DATED | : April 17, 2012 | |
| INVENTOR(S) | : Yokota et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 340 days.

Signed and Sealed this
Thirty-first Day of July, 2012

David J. Kappos
*Director of the United States Patent and Trademark Office*